(12) United States Patent
Bert

(10) Patent No.: US 8,825,950 B2
(45) Date of Patent: Sep. 2, 2014

(54) REDUNDANT ARRAY OF INEXPENSIVE DISKS (RAID) SYSTEM CONFIGURED TO REDUCE REBUILD TIME AND TO PREVENT DATA SPRAWL

(75) Inventor: Luca Bert, Cumming, GA (US)

(73) Assignee: LSI Corporation, Milpitas, CA (US)

( * ) Notice: Subject to any disclaimer, the term of this patent is extended or adjusted under 35 U.S.C. 154(b) by 706 days.

(21) Appl. No.: 13/037,895

(22) Filed: Mar. 1, 2011

(65) Prior Publication Data

US 2012/0226853 A1    Sep. 6, 2012

(51) Int. Cl.
*G06F 12/00*     (2006.01)
*G06F 12/06*     (2006.01)
*G06F 12/02*     (2006.01)

(52) U.S. Cl.
CPC ........ *G06F 12/0615* (2013.01); *G06F 12/0646* (2013.01); *G06F 12/02* (2013.01)
USPC ............................ 711/114; 711/165; 711/173

(58) Field of Classification Search
CPC ..... G06F 12/00; G06F 12/02; G06F 12/0615; G06F 12/0646
See application file for complete search history.

(56) References Cited

U.S. PATENT DOCUMENTS

| | | | |
|---|---|---|---|
| 2006/0112302 A1* | 5/2006 | Cherian | 714/6 |
| 2009/0271659 A1 | 10/2009 | Troppens et al. | |
| 2010/0023685 A1* | 1/2010 | Ikejiri et al. | 711/114 |

* cited by examiner

*Primary Examiner* — Matthew Bradley
*Assistant Examiner* — Arvind Talukdar
(74) *Attorney, Agent, or Firm* — Smith Risley Tempel Santos LLC

(57) ABSTRACT

A RAID system is provided in which, in the event that a rebuild is to be performed for one of the PDs, a filter driver of the operating system of the computer of the RAID system informs the RAID controller of the RAID system of addresses in the virtual memory that are unused. Unused virtual memory addresses are those which have never been written by the OS as well as those which have been written by the OS and subsequently freed by the OS. The RAID controller translates the unused virtual memory addresses into unused physical addresses. The RAID controller then reconstructs data and parity only for the unused physical addresses in the PD for which the rebuild is being performed. This reduces the amount of data and parity that are rebuilt during a rebuild process and reduces the amount of time that is required to perform the rebuild process. In addition, the RAID system is capable of being configured to prevent or reduce data sprawl.

10 Claims, 5 Drawing Sheets

REDUNDANT ARRAY OF INEXPENSIVE DISKS (RAID) SYSTEM CONFIGURED TO REDUCE REBUILD TIME AND TO PREVENT DATA SPRAWL

TECHNICAL FIELD OF THE INVENTION

The invention relates generally to storage systems that implement Redundant Array of Inexpensive Disks (RAID) technology. More particularly, the invention relates to a RAID system that is capable of performing rebuild processes in a reduced amount of time and that is capable of reducing or preventing data sprawl.

BACKGROUND OF THE INVENTION

A storage array or disk array is a data storage device that includes multiple disk drives or similar persistent storage units. A storage array can allow large amounts of data to be stored in an efficient manner. A storage array also can provide redundancy to promote reliability, as in the case of a RAID system. In general, RAID systems simultaneously use two or more hard disk drives, referred to herein as physical disk drives (PDs), to achieve greater levels of performance, reliability and/or larger data volume sizes. The phrase "RAID" is generally used to describe computer data storage schemes that divide and replicate data among multiple PDs. In RAID systems, one or more PDs are set up as a RAID virtual disk drive (VD). In a RAID VD, data might be distributed across multiple PDs, but the VD is seen by the user and by the operating system of the computer as a single disk. The VD is "virtual" in that storage space in the VD maps to the physical storage space in the PDs, but the VD usually does not itself represent a single physical storage device.

Although a variety of different RAID system designs exist, all have two key design goals, namely: (1) to increase data reliability and (2) to increase input/output (I/O) performance. RAID has seven basic levels corresponding to different system designs. The seven basic RAID levels are typically referred to as RAID levels 0-6. RAID level 5 uses striping in combination with distributed parity. The term "striping" means that logically sequential data, such as a single data file, is fragmented and assigned to multiple PDs in a round-robin fashion. Thus, the data is said to be "striped" over multiple PDs when the data is written. The term "distributed parity" means that the parity bits that are calculated for each strip of data are distributed over all of the PDs rather than being stored on one or more dedicated parity PDs. Striping improves performance because the data fragments that make up each data stripe are written in parallel to different PDs and read in parallel from the different PDs. Distributing the parity bits also improves performance in that the parity bits associated with different data stripes can be written in parallel to different PDs using parallel write operations as opposed to having to use sequential write operations to a dedicated parity PD.

In order to implement distributed parity, all but one of the PDs must be present for the system to operate. Failure of any one of the PDs necessitates replacement of the PD, but does not cause the system to fail. Upon failure of one of the PDs, the data and parity that was on the failed PD can be rebuilt by using the data and parity stored on the other PDs to reconstruct the data and parity that was stored on the failed PD.

In order to demonstrate the manner in which a rebuild process is typically performed, the manner in which a known RAID system typically operates will be described with reference to FIG. 1. FIG. 1 illustrates a block diagram of a known RAID system 2 comprising a computer 3, a RAID controller 4, and array 5 of PDs 6. When the computer 3 has data to write, an OS 7 of the computer 3 generates a write command, which is received by a file system (FS) 8 of the OS 7. The FS 8 then issues an input/output (IO) command to the RAID controller 4. The IO command contains the data to be written and virtual memory addresses where the data is currently located in a virtual memory 9. A RAID processor 4a of the RAID controller 4 receives the IO command and then maps the virtual memory addresses to physical addresses in one or more of the PDs 6. The RAID processor 4a maintains a table of the virtual-to-physical address mapping in a local memory device 4b of the RAID controller 4. The RAID controller 4 then causes the data to be written to the physical addresses in one or more of the PDs 6.

If one of the PDs 6 fails, the failed PD 6 is rebuilt by reading all of the stripes from the PDs 6 other than the failed PD 6, computing the data and parity of the failed PD 6 from all of the stripes read from the other PDs 6, and writing the computed data and parity to a replacement PD. The main issues associated with this rebuild technique are that they (1) take a very long time to perform, (2) consume a large amount of resources, and (3) detrimentally impact system performance during the rebuild process. In addition, while the rebuild process is ongoing, the RAID system 2 is at a lower level of protection or is without protection from data integrity risks in the event that another of the PDs 6 fails. Rebuilds can take days or weeks, and the performance of the RAID system 2 is detrimentally impacted during that time period.

In addition, as technological improvements in storage devices are made, their storage capacity greatly increases over time. For example, for some types of storage devices, storage capacity doubles every eighteen months or so. These increases in storage capacity mean that, in the event that one of the PDs fails, an even larger number of stripes are used to compute the new data and parity, which results in an even larger number of computations. Consequently, the amount of time that is required to perform the rebuild is further increased. Interestingly, a large part of the failed PD 6 is typically unused, but because this is not known to the RAID controller 4, it has no other option but to rebuild the failed PD 6 in its entirety.

One technique that has been used to reduce the amount of data and parity that has to be computed during a rebuild involves only rebuilding "used" portions of the failed PD 6. A portion of a PD 6 is considered "used" if it has been written with data. With this technique, the RAID controller 4 of the RAID system 2 marks zones on the PDs 6 that have been written so that it is able to distinguish between zones that have been written and zones that have not been written. If a PD 6 subsequently fails, new data and parity are only computed for zones in the failed PD 6 that were marked as written at the time of the failure.

This technique has several disadvantages. One drawback is that the FS 8 often moves data around, which causes the same data to be stored in different zones of the PDs 6 at different times. The OS 7 may subsequently free data, but although the FS 8 is aware that the data has been freed, the RAID controller 4 is not made aware that the data has been freed. Therefore, the RAID controller 4 continues to consider the zone in the PD 6 in which the freed data is stored as "used". Consequently, any zone in the failed PD 6 that was "touched" (i.e., written) at any point in time will be rebuilt. This results in more data being rebuilt than is necessary, and the process tends to be degenerative over time. Another disadvantage of this technique is that services and applications exist that by their nature use inordinate amounts of space on PDs 6 temporarily and then free the data. Again, while the FS 8 is aware that the data has been freed, the RAID controller 4 is not, and so any zones in the failed PD 6 that were "touched" are considered "used" and therefore will be rebuilt. Consequently, much more data and parity are rebuilt than is necessary.

Yet another drawback of this technique results from the manner in which FSs typically operate. FSs are typically designed such that when making a choice between writing data to space that has never been written and writing data to space that has been written and subsequently freed, they choose to write data to space that has never been written. This results in "data sprawl" in that data gets written to more areas in the PDs than is necessary. Even if the data is subsequently freed, the RAID controller is unaware that the data has been freed and considers the corresponding zones in the PDs as used. Consequently, if a PD fails, any zones that were previously written, even if subsequently freed, will be rebuilt, which results in more data being rebuilt than is necessary. In addition, data sprawl can also result in only a small portion of a zone actually being used while other portions of the same zone are unused. When the zone is rebuilt, both the used and unused portions of the zone are rebuilt. Again, this results in more data being rebuilt than is necessary.

Accordingly, a need exists for a way to reduce the amount of time that is required to perform a rebuild process in a RAID system. A need also exists for a way to reduce the amount of data that needs to be rebuilt when performing a rebuild in a RAID system. A need also exists for a way to prevent data sprawl in a RAID system.

SUMMARY OF THE INVENTION

The invention is directed to a RAID system that is capable of reducing the amount of time that is required to perform a rebuild process and that is capable of preventing data sprawl. The invention is also directed to computer-readable mediums (CRMs) having computer instructions stored thereon for reducing rebuild time and for preventing data sprawl. The RAID system comprises a computer, an array of PDs, and a RAID controller interfaced with the computer and with the array of PDs. The computer comprises at least a first processor and a first local storage system. An OS of the computer runs on the first processor and uses the first local storage system. The OS includes at least a FS. The FS uses a portion of the first local storage system as virtual memory and maintains a virtual memory table in the first local storage system.

In the RAID system capable of performing a rebuild, the virtual memory table comprises at least entries identifying addresses in the virtual memory that are currently being used by the FS. Virtual memory addresses are currently being used by the FS if they have been written by the FS and have not been freed by the FS subsequent to being written by the FS. The OS causes the virtual memory addresses that have been written by the FS and the corresponding data to be output from the computer. In the event that a rebuild process is to be performed for one of the PDs, the RAID controller identifies to a filter driver of the OS one or more virtual memory disks in the virtual memory that contain the data that is stored in the PD for which the rebuild process is being performed. The filter driver scans a portion of the virtual memory table corresponding to the identified virtual memory disk or disks and identifies used virtual memory addresses. The filter driver then causes the used virtual memory addresses to be output to the RAID controller. The RAID controller translates the used virtual memory addresses into used physical addresses and causes data and parity to be reconstructed for the used physical addresses.

In the RAID system capable of reducing data sprawl, the RAID controller allocates a first portion of the array for use by the OS that is less than the maximum storage capacity of the array. The RAID controller receives, over the interface with the computer, at least the virtual memory addresses and the corresponding data and causes the received data to be written only to the allocated first portion of the array. If the RAID controller determines that the allocated first portion of the array is close to being filled with data, the RAID controller allocates at least one additional portion of the array for use by the OS and causes the data being received in the RAID controller from the computer to be written only to the additionally-allocated portion of the array.

A method for performing a rebuild in a RAID system comprises the following: in the event that a rebuild process is to be performed for one of the PDs, outputting from the RAID controller to the filter driver of the OS identifiers of one or more virtual memory disks of the virtual memory of the computer that contain data corresponding to data stored in the physical memory addresses of the PD for which the rebuild process is being performed; with the filter driver, receiving the identifiers in the computer and scanning a virtual memory table of the OS to identify used virtual memory addresses associated with the identifiers; with the filter driver, causing the used virtual memory addresses to be output from the computer to the RAID controller; in the RAID controller, translating the used virtual memory addresses into used physical memory addresses of the PD for which the rebuild process is being performed, and in the RAID controller, rebuilding data and parity for the used physical addresses of the PD for which the rebuild process is being performed.

A method for reducing data sprawl in the RAID system comprises the following: in the RAID controller, allocating a first portion of storage space in the array of PDs for use by the OS of the computer; in the RAID controller, receiving, over an interface with the computer, virtual memory addresses of the virtual memory of the computer and data written to the virtual memory addresses by the OS; in the RAID controller, causing the received data to be written only to the allocated first portion of the array; in the RAID controller, determining whether the allocated first portion of the array is close to being filled with data; and, in the RAID controller, if it is determined that the allocated first portion of the array is close to being filled with data, allocating an additional portion of the array for use by the OS and causing the received data to be written only to the additionally allocated portion of the array.

A CRM comprising a computer software program for performing a rebuild in a RAID system comprises a first code segment for execution by the RAID controller, a second code segment for execution by the computer, and third and fourth code segments for execution by the RAID controller. In the event that a rebuild process is to be performed for one of the PDs, the first code segment causes identifiers of one or more virtual memory disks of a virtual memory that correspond to physical memory addresses of the PD for which the rebuild process is to be performed to be output from the RAID controller. The second code segment is a filter driver code segment that receives the identifiers output from the RAID controller and scans the virtual memory table of the OS to identify used virtual memory addresses associated with the identifiers. Used virtual memory addresses are virtual memory addresses that have been written by the FS of the OS and that have not been freed by the FS subsequent to being written by the FS. The filter driver code segment causes the used virtual memory addresses to be output from the computer to the RAID controller. The third code segment translates the used virtual memory addresses into used physical memory addresses of the PD for which the rebuild process is being performed. The fourth code segment then reconstructs data and parity for the used physical addresses of the PD for which the rebuild process is being performed.

A CRM comprising a computer software program for reducing data sprawl in a RAID system comprises first, second, third, fourth, and fifth code segments for execution by the RAID controller. The first code segment allocates a first portion of storage space in the array of PDs for use by the OS of the computer. The second code segment receives, in the RAID controller, virtual memory addresses of the virtual memory of the computer and data written to the virtual memory addresses by the OS. The third code segment causes the received data to be written only to the allocated first portion of the array. The fourth code segment determines whether the allocated first portion of the array is close to being filled with data. If it is determined by the fourth code segment that the allocated first portion of the array is close to being filled with data, the fifth code segment allocates an additional portion of the array for use by the OS and causes data being received in the RAID controller from the computer to be written only to the additionally allocated portion of the array.

These and other features and advantages of the invention will become apparent from the following description, drawings and claims.

DETAILED DESCRIPTION OF ILLUSTRATIVE EMBODIMENTS

In accordance with a first aspect of the invention, a filter driver is provided in the OS of the computer of the RAID system that, in the event that one of the PDs is to be rebuilt, scans the virtual memory table of the computer to identify virtual memory addresses that are used and communicates the identified virtual memory addresses to the RAID controller. The RAID controller translates the identified virtual memory addresses into physical addresses of the PD being rebuilt. The RAID controller then rebuilds data and parity only for physical addresses in the PD that are associated with the virtual memory addresses identified by the filter driver. This reduces the amount of data and parity that are rebuilt during a rebuild process and reduces the amount of time that is required to perform the rebuild process.

In accordance with a second aspect of the invention, data is stored in the PDs in a way that limits data sprawl. By limiting data sprawl, the number of addresses in the PDs containing data and parity that have to be rebuilt is reduced, thereby reducing the amount of time that is required to perform the rebuild process. The first and second aspects of the invention may be employed together or separately.

The terms "rebuild," "rebuilding," "rebuilding process," and the like, as those terms are used herein, are intended to denote the known process of reconstructing data and parity when a PD is being replaced, either due to its failure or for any other reason, such as to upgrade the RAID system. As is known in the art, data and parity associated with addresses in a PD being replaced are computed using data and parity stored in the other PDs, typically by exclusively ORing the data and parity from the other PDs using known equations. Therefore, in the interest of brevity, the manner in which these computations are performed will not be described herein. Embodiments of the invention use these known computational methods to reconstruct data and parity, but reduce the amount of data and parity that have to be reconstructed, and therefore reduce the amount of time that is required to rebuild the PD being replaced. Illustrative, or exemplary, embodiments of the first aspect of the invention will now be described with reference to FIGS. 2-3.

Figure 2:
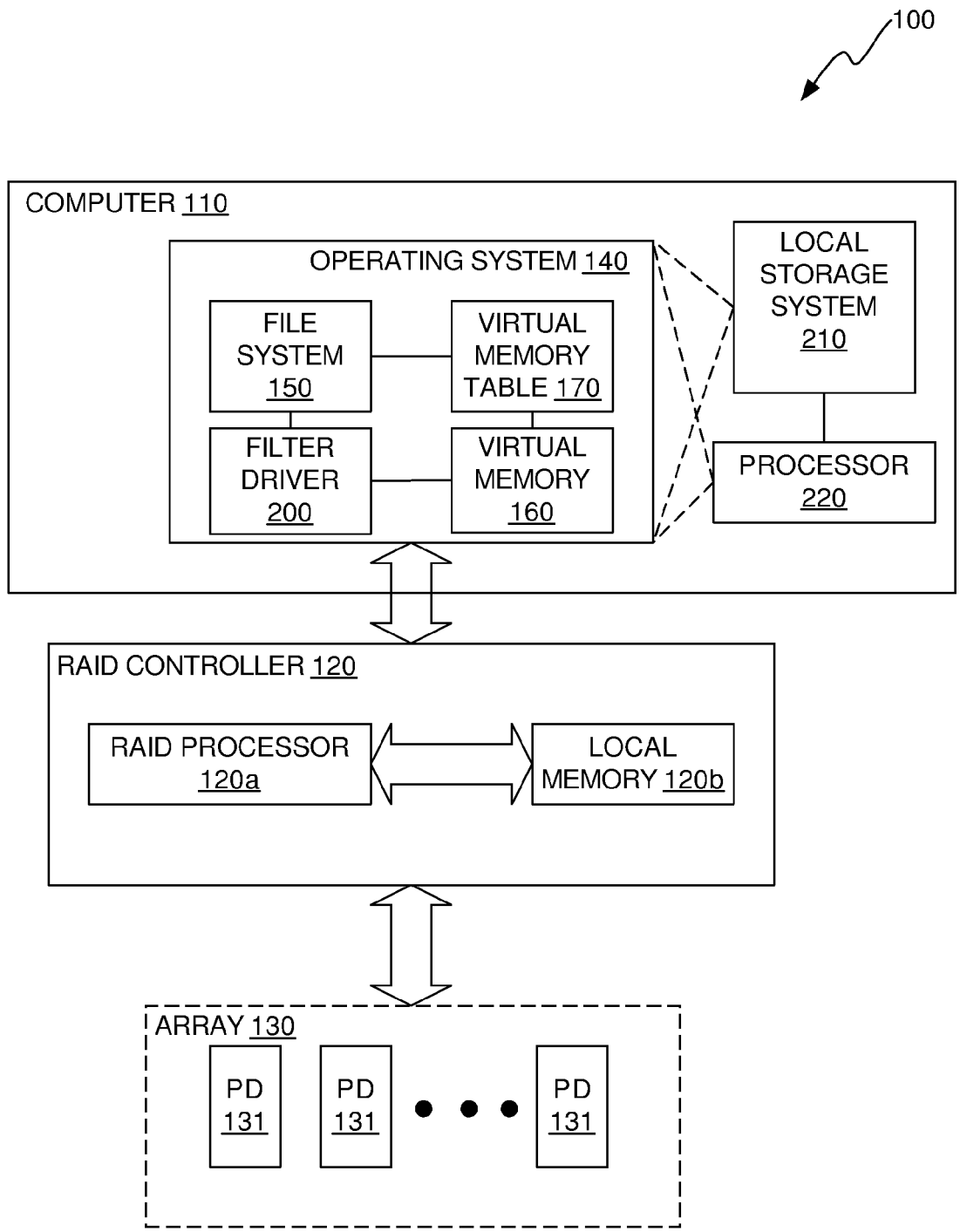
FIG. 2 illustrates a block diagram of a RAID system in accordance with an illustrative embodiment configured to reduce the amount of time that is required to perform a rebuild process and to reduce the amount of data and parity that have to be rebuilt during the rebuild process.

FIG. 2 illustrates a block diagram of a RAID system 100 in accordance with an illustrative embodiment configured to reduce the amount of time that is required to perform a rebuild process and to reduce the amount of data and parity that have to be rebuilt during the rebuild process. The RAID system 100 includes a computer 110, a RAID controller 120, and an array 130 of PDs 131. The computer 110 may be any type of computer, but it is typically a server. The computer 110 includes an OS 140 having an FS 150, a virtual memory 160, a virtual memory table 170, and a filter driver 200. Although the filter driver 200 is depicted as being separate from the FS 150, the filter driver 200 may be part of the FS 150.

The OS 140, the FS 150, and the filter driver 200 are typically implemented as computer software programs that reside in a local storage system 210 of the computer 110 and that are executed by at least one processor 220 of the computer 110. The local storage system 210 typically comprises at least one hard disk drive (HDD) (not shown) and at least one solid state memory device (not shown). The virtual memory 160 and the virtual memory table 170 reside in the local storage system 210 of the computer 110.

When the computer 110 has data to write, the OS 140 generates a write command, which is received by the FS 150. The FS 150 then writes the data to addresses in the virtual memory 160 and creates entries in the virtual memory table 170 that indicate where the data is stored in the virtual memory 160. The FS 150 then issues an IO command to the RAID controller 120. The IO command contains the data to be written and the virtual memory addresses where the data is currently located in the virtual memory 160. A RAID processor 120a of the RAID controller 120 receives the IO command and then maps the virtual memory addresses to physical memory addresses in one or more of the PDs 131 of the array 130. The RAID processor 120a maintains a mapping table of the virtual-to-physical address mapping in a local memory device 120b of the RAID controller 120. Alternatively, the mapping table could be stored in an external memory device (not shown) that is accessible by the RAID processor 120a. The RAID controller 120 then causes the data to be written to the physical addresses in one or more of the PDs 131.

Figure 1:
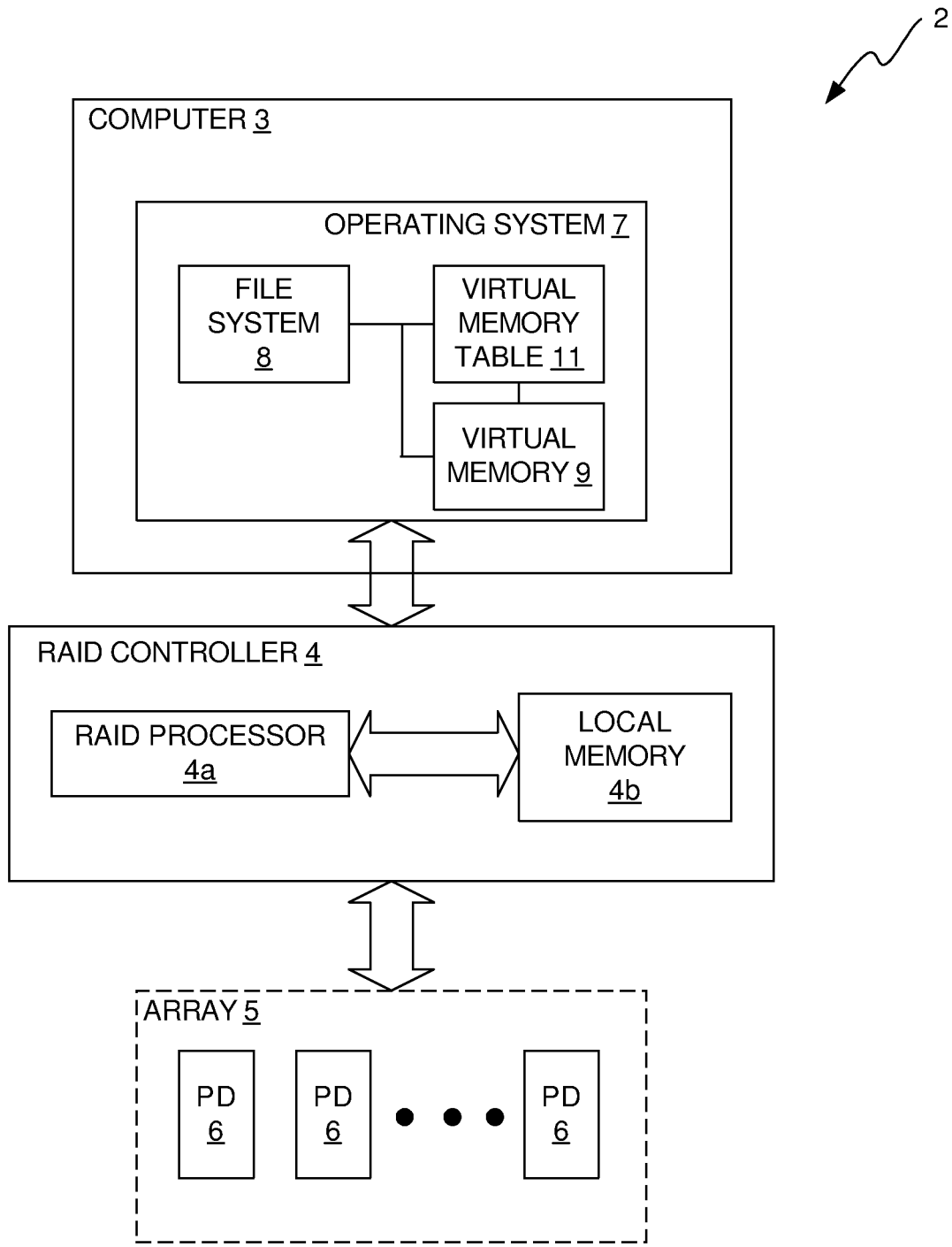
FIG. 1 illustrates a block diagram of a known RAID system.

As indicated above with reference to FIG. 1, one of the problems with the known rebuild technique results from the fact that when the OS 7 frees data, the RAID controller 4 is unaware that the data has been freed. Therefore, the RAID controller 4 does not know to free the corresponding data in the PDs 6. As a result, the corresponding physical addresses in the PDs 6 are considered by the RAID controller 4 to be used, i.e., to contain valid data. Consequently, if one of the PDs 6 fails, any addresses in the failed PD 6 that were written at any point in time are rebuilt, even if those addresses contain data that has been freed in the virtual memory 9 by the OS 7.

In contrast to the known RAID system and rebuild technique, in accordance with embodiments of the invention, if a rebuild is to be performed for one of the PDs 131, the filter driver 200 identifies used virtual memory addresses in the virtual memory 160 that correspond to physical addresses in the PD 131 being rebuilt. Virtual memory addresses that are used are those which have been written by the FS 150 and not subsequently freed by the FS 150. The filter driver 200 then causes the used virtual memory addresses to be communicated to the RAID controller 120. The RAID processor 120a translates the used virtual memory addresses into their corresponding physical addresses in the PD 131 being rebuilt. The RAID controller 120 then rebuilds data and parity only for the physical addresses in the PD 131 that correspond to the used virtual memory addresses identified by the filter driver 200.

Figure 3:
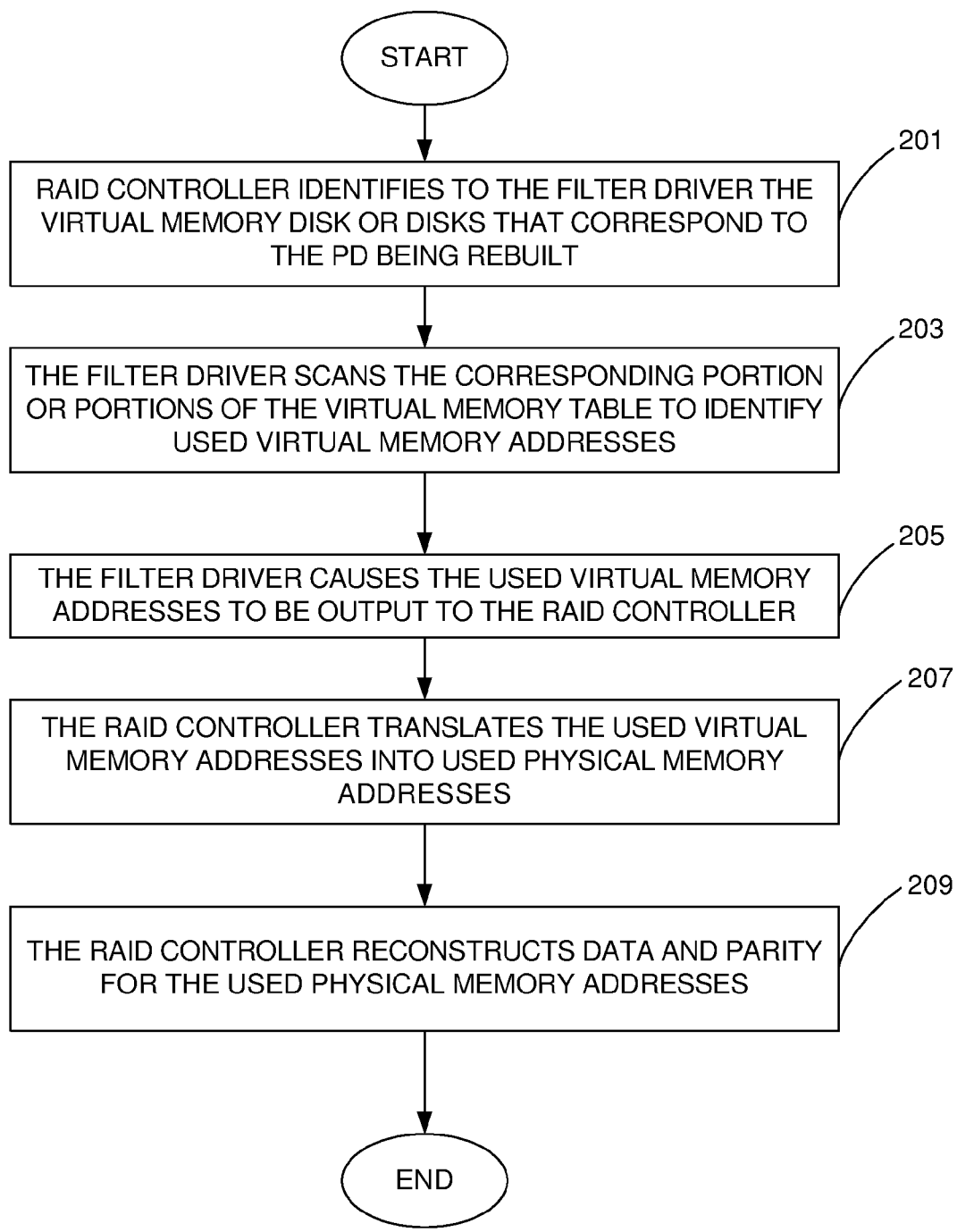
FIG. 3 illustrates a flowchart that demonstrates the rebuild process in accordance with an illustrative embodiment.

FIG. 3 illustrates a flowchart that demonstrates an example of a method for determining which data needs to be rebuilt and for rebuilding the data. When one of the PDs 131 is to be rebuilt, the RAID controller 120 identifies to the filter driver 200 the virtual memory disk or disks that correspond to the PD 131 being rebuilt, as indicated by block 201. The filter driver 200 then scans the corresponding portion of the virtual memory table 170 and identifies the used virtual memory addresses, as indicated by block 203. The filter driver 200 then causes the used virtual memory addresses to be output to the RAID controller 120, as indicated by block 205. The RAID controller 120 translates the used virtual memory addresses into physical memory addresses in the PD 131, as indicated by block 207. The RAID controller 120 then reconstructs data and parity only for those physical addresses of the PD 131 being rebuilt, as indicated by block 209.

It can be seen from the above description of FIG. 3 that the method is partially performed by the filter driver 200 of the OS 140 and partially by the RAID controller 120. Both parts are typically implemented as computer software programs. The computer software program corresponding to the filter driver 200 is executed by the processor 220 of the computer 110 running the OS 140. The computer software program performed by the RAID controller 120 is executed by the processor 120a of the RAID controller 120. The computer software programs are typically stored on two separate computer-readable mediums (CRMs), one of which typically resides in the local storage system 210 of the computer 110 and the other of which typically resides in the local memory element 120b of the RAID controller 120. Any type of CRM may be used for this purpose including solid state memory devices, magnetic memory devices and optical memory devices. Solid state memory devices that are suitable for this purpose include, for example, Random Access Memory (RAM) devices, Read-Only Memory (ROM) devices, programmable ROM (PROM) devices, erasable PROM (EPROM) devices, and flash memory devices. It should be noted, however, that the method could be performed in hardware or in a combination of hardware and software or firmware.

Illustrative, or exemplary, embodiments of the aforementioned second aspect of the invention will now be described with reference to FIGS. 4 and 5. As mentioned above, the second aspect of the invention relates to reducing data sprawl in a RAID system so that in the event that a rebuild has to be performed, the amount of data that has to be rebuilt and the amount of time that is required to perform the rebuild process are reduced. With the known RAID system 2 shown in FIG. 1, the FS 8 typically causes data to be spread around the array 5 for the reasons described above, thereby resulting in data sprawl. In addition to increasing disk seek times, data sprawl increases the number of addresses in a failed PD 6 that have to be rebuilt because any address in the failed PD 6 that has been "touched", i.e., written, is rebuilt, even if the corresponding data in virtual memory 9 was subsequently freed after being written. The manner in which data sprawl and its effects are prevented will now be described with reference to FIGS. 2, 4 and 5.

With reference again to FIG. 2, the RAID controller 120 allocates storage space in the PDs 131 in a way that prevents data from being spread around the array 130. At initialization, the RAID controller 120 allocates less than all of the storage space of the array 130 for use by the OS 140. In addition, the space that is initially allocated comprises addresses that are typically contiguous, or at least substantially contiguous. For example, if the array 130 has an available storage capacity of 1 terabyte (TB), the RAID controller 120 may initially allocate 200 gigabytes (GBs), or about 20%. As the FS 150 of the OS 140 writes data, the RAID controller 120 writes the data to addresses in the PDs 131 of the array 130 that are in the initially allocated space, thereby confining the data and parity to particular portions of the array 130. As the initially allocated space becomes close to being filled, the RAID controller 120 allocates additional space in the array 130 that is contiguous or substantially contiguous with the initially allocated space. Thus, space allocated earlier in time is filled before space allocated later in time is filled, and the data is confined to the allocated space. In this way, data sprawl is prevented or at least reduced, which reduces disk seek times and the amount of time that is required to perform a rebuild in the event that one of the PDs 131 fails.

Figure 4:
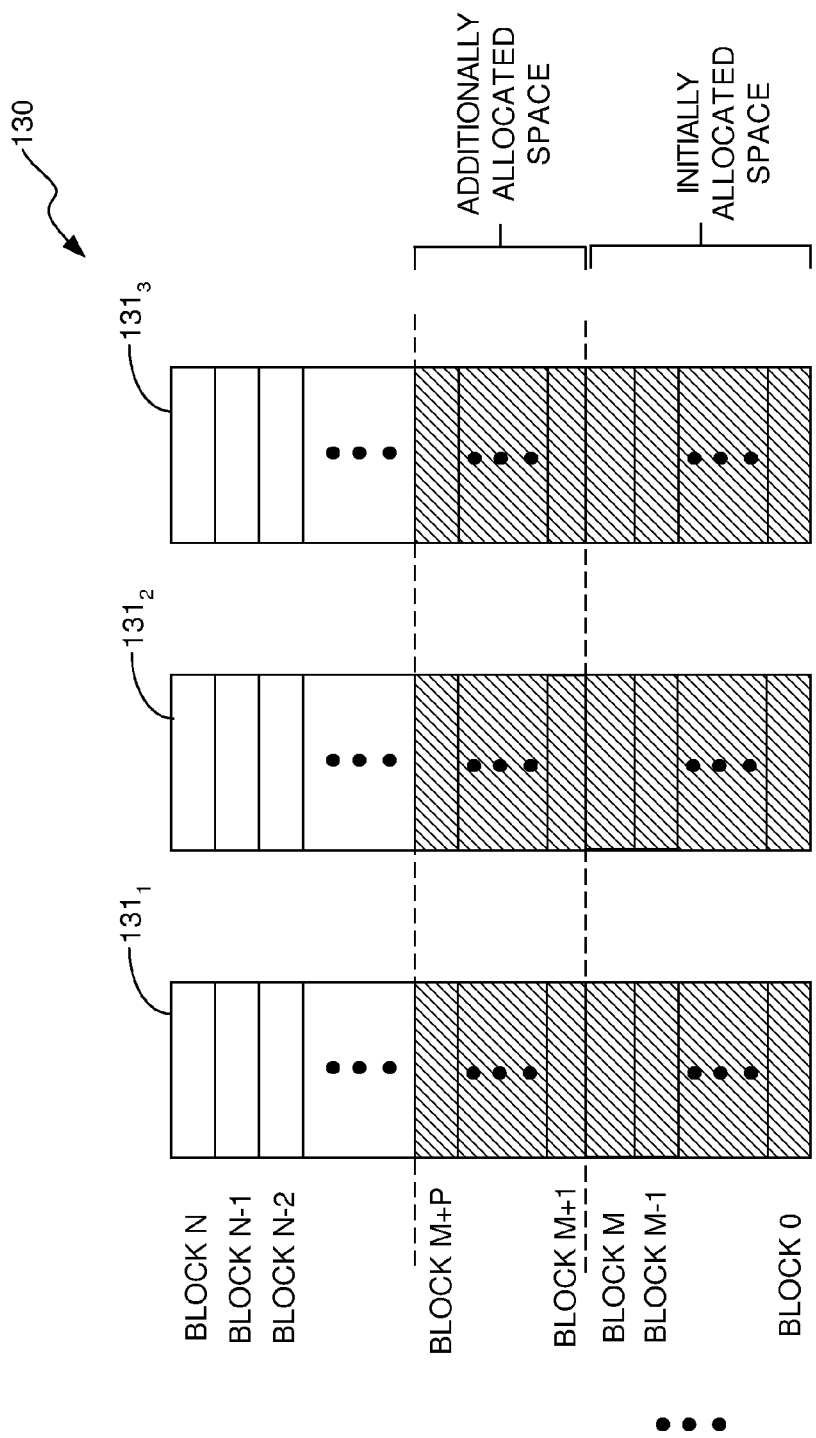
FIG. 4 illustrates the array of PDs shown in FIG. 2 and demonstrates the manner in which data sprawl is reduced or prevented in accordance with an illustrative embodiment.

FIG. 4 illustrates the array 130 of PDs 131 shown in FIG. 2 in accordance with an exemplary embodiment in which the array 130 is made up of three PDs 131$_1$, 131$_2$ and 131$_3$. For exemplary purposes, it will be assumed that each of the PDs 131$_1$, 131$_2$ and 131$_3$ is made up of N blocks of storage space, wherein N is a positive integer. At initialization, the RAID controller 120 initially allocates M blocks of storage space in each of the PDs 131$_1$, 131$_2$ and 131$_3$ for use by the FS 150, where M is a positive integer that is greater than 0 and less than N. As the FS 150 writes data by sending IO commands to the RAID controller 120, the RAID controller 120 causes the data and parity to be stored in the M blocks that were initially allocated for use. When the M blocks of storage space are close to being full (e.g., 90% full), the RAID controller 120 allocates additional space comprising P blocks of storage space in the PDs 131$_1$, 131$_2$ and 131$_3$, where P is a positive integer that is less than N and that is less than, equal to or greater than M. Typically, P will be less than or equal to M.

Because of the manner in which storage space in the PDs 131 is allocated, disk seek times are reduced, which improves performance. In addition, in the event that one of the PDs 131 fails, the rebuild process can be performed in less time due to the fact that the data is more confined as opposed to being spread around throughout the array 130. In addition, if the second aspect of the invention is combined with the first aspect of the invention such that data that is written by the OS 140 and subsequently freed by the OS 140 is not rebuilt by the RAID controller 120, the amount of time that is required to perform the rebuild process can be even further reduced.

Figure 5:
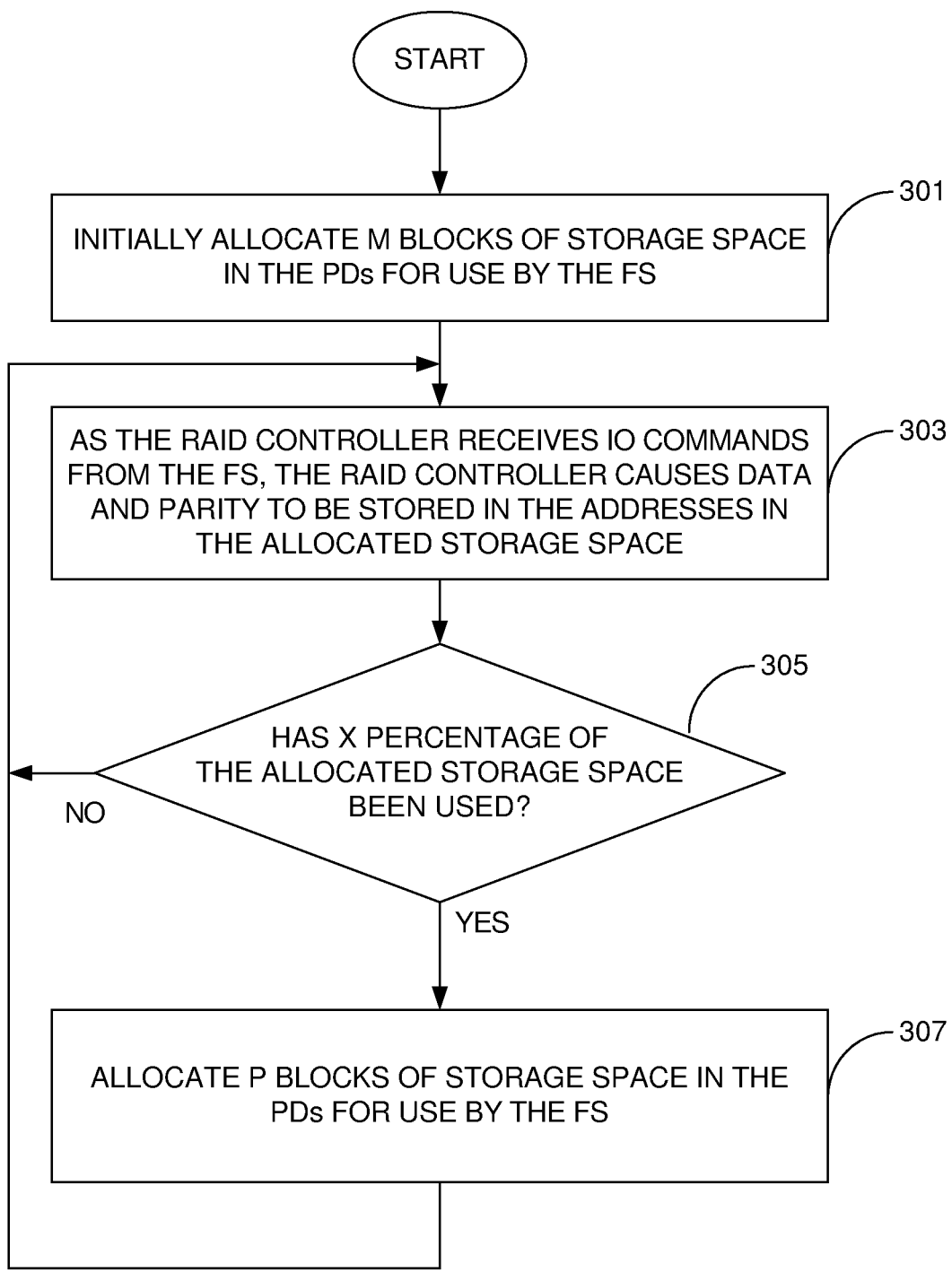
FIG. 5 illustrates a flowchart that represents the method performed by the RAID system shown in FIG. 2 to prevent data sprawl.

FIG. 5 illustrates a flowchart that represents the method performed by the RAID system 100 shown in FIG. 2 to prevent data sprawl. At the start, i.e., when the RAID system 100 is initialized, the RAID controller 120 initially allocates M blocks of storage space in each of the PDs 131 as available for use by the FS 150, as indicated by block 301. As the FS 150 writes data by sending IO commands to the RAID controller 120, the RAID controller 120 causes the data and parity to be stored in addresses within the M blocks that were initially allocated for use, as indicated by block 303. A determination is then made as to whether X percentage of the allocated space has been filled, where X is an integer that is less than or equal to 100, as indicated by block 305. Alternatively, X could correspond to a percentage of the allocated space that is unfilled, e.g., 10%. If the query of block 305 is answered in the affirmative, then the process proceeds to block 307 at which the RAID controller 120 allocates P blocks of additional storage space in the PDs 131, assuming there is storage space remaining in the PDs 130. The process then returns to block 303.

It should be noted that many variations may be made to the process described above with reference to FIGS. 4 and 5. For example, although it is assumed in the illustrative embodiment that each PD 131 has N blocks of storage capacity, the PDs 131 may not always be identical types of storage devices and/or may not always have the same storage capacity. Also, while block 305 uses a threshold percentage, X, the threshold could instead be a particular number of blocks filled or a particular number of blocks remaining unfilled. For example, rather than determining when a particular percentage of the allocated space has been filled or remains unfilled, the process may determine when X of the allocated blocks have been filled or remain unfilled. In addition, while the M blocks that are initially allocated and the P blocks that are subsequently allocated are typically contiguous portions of the array 130, this is not a requirement of the invention. Although using contiguous portions of the array 130 reduces disk seek times, thereby improving performance and reducing rebuild time, the allocated portions may be noncontiguous while still achieving a reduction in disk seek times and rebuild time.

As indicated above, although the methods represented by the flowcharts of FIGS. 3 and 5 may be performed separately or together, performing them together further reduces the amount of data that is required to be rebuilt and the amount of time that is spent performing a rebuild process. The method represented by the flowchart of FIG. 5 is typically implemented in a computer software program that is stored in the local memory 120b of the RAID controller 120 and executed by the processor 120a of the RAID controller 120. The method represented by the flowchart of FIG. 5 may, however, be implemented in hardware or in a combination of hardware and software and/or firmware, as will be understood by those skilled in the art in view of the description being provided herein.

It should be noted that the invention has been described herein with reference to a few illustrative embodiments for the purposes of describing the principles and concepts of the invention. The invention is not limited to the embodiments described herein, as will be understood by persons skilled in the art in view of the description provided herein. Modifications may be made to the embodiments described herein and all such modifications are within the scope of the invention, as will be understood by persons skilled in the art in view of the description provided herein.

What is claimed is:

1. A Redundant Array of Inexpensive Disks (RAID) system comprising:
    a computer comprising:
        at least a first processor; and
        a first local storage system, wherein an operating system (OS) of the computer runs on the first processor and uses the first local storage system, the OS including at least a file system (FS), the FS using a portion of the first local storage system as virtual memory and maintaining a virtual memory table in the first local storage system containing at least entries identifying addresses in the virtual memory that have been written by the FS, wherein the OS causes the virtual memory addresses that have been written by the FS and the corresponding data to be output from the computer;
    an array of physical disks (PDs), the array having a maximum storage capacity; and
    a RAID controller interfaced with the computer and with the array of PDs, the RAID controller allocating a first portion of the array for use by the OS that is less than the maximum storage capacity of the array, the RAID controller receiving, over the interface with the computer, at least the virtual memory addresses and the corresponding data, the RAID controller translating the received virtual memory addresses into physical addresses in the PDs, and wherein the RAID controller causes the received data to be written only to physical addresses in the allocated first portion of the array, and wherein if the RAID controller determines that the allocated first portion of the array is close to being filled with data, the RAID controller allocates an additional portion of the array for use by the OS and causes the received data to be written only to physical addresses in the additionally allocated portion of the array.

2. The RAID system of claim 1, wherein the first allocated portion and the additionally allocated portion are contiguous.

3. The RAID system of claim 1, wherein the first allocated portion and the additionally allocated portion are noncontiguous.

4. The RAID system of claim 1, wherein the OS further comprises a filter driver, and wherein the virtual memory table comprises at least entries identifying virtual memory addresses in the virtual memory that are used, wherein used virtual memory addresses are those that have been written by the FS and have not been freed by the FS subsequent to being written by the FS, and wherein in an event that one of the PDs is to be rebuilt, the filter driver scans the virtual memory table and obtains the used virtual memory addresses and causes the used virtual memory addresses to be output from the computer to the RAID controller, the RAID controller translating the used virtual memory addresses into used physical memory addresses in the PD to be rebuilt, and wherein the RAID controller causes data and parity to be reconstructed for the used physical memory addresses.

5. The RAID system of claim 4, wherein the filter driver is part of the FS.

6. The RAID system of claim 4, wherein the filter driver is separate from the FS.

7. A method for reducing or preventing data sprawl in a Redundant Array of Inexpensive Disks (RAID) system, the RAID system comprising a computer, an array of physical disks (PDs), and a RAID controller interfaced with the computer and with the array of PDs, the method comprising:
    in the RAID controller, allocating a first portion of storage space in the array of PDs for use by an operating system (OS) of the computer, the first portion of storage space being less than a maximum storage capacity of the array;
    in the RAID controller, receiving, over an interface with the computer, virtual memory addresses of a virtual memory of the computer and data written to the virtual memory addresses by the OS;
    in the RAID controller, causing the received data to be written only to the allocated first portion of the array;

in the RAID controller, determining whether the allocated first portion of the array is close to being filled with data; and in the RAID controller, if it is determined that the allocated first portion of the array is close to being filled with data, allocating an additional portion of the array for use by the OS and causing the received data to be written only to the additionally allocated portion of the array.

8. The method of claim 7, further comprising:

in an event that a rebuild process is to be performed for one of the PDs, outputting from the RAID controller to a filter driver of the OS identifiers of one or more virtual memory disks of the virtual memory that correspond to the physical memory addresses of the PD for which the rebuild process is to be performed;

with the filter driver, receiving the identifiers in the computer and scanning a virtual memory table of the OS to identify used virtual memory addresses associated with the identifiers, wherein used virtual memory addresses are virtual memory addresses that have been written by a file system (FS) of the OS and that have not been freed by the FS subsequent to being written by the FS;

with the filter driver, causing the used virtual memory addresses to be output from the computer to the RAID controller;

in the RAID controller, translating the used virtual memory addresses into used physical memory addresses of the PD for which the rebuild process is being performed, and in the RAID controller, rebuilding data and parity for the used physical addresses of the PD for which the rebuild process is being performed.

9. A non-transitory computer-readable medium (CRM) having a computer software program embodied therein for reducing or preventing data sprawl in a Redundant Array of Inexpensive Disks (RAID) system, the RAID system comprising a computer, an array of physical disks (PDs), and a RAID controller interfaced with the computer and with the array of PDs, the computer software program comprising instructions for execution by the RAID controller, the CRM comprising:

a first code segment for execution by the RAID controller, the first code segment allocating a first portion of storage space in the array of PDs for use by an operating system (OS) of the computer, the first portion of storage space being less than a maximum storage capacity of the array;

a second code segment for execution by the RAID controller, the second code segment receiving, over an interface with the computer, virtual memory addresses of a virtual memory of the computer and data written to the virtual memory addresses by the OS;

a third code segment for execution by the RAID controller, the third code segment translating the received virtual memory addresses into physical memory addresses in the PDs and causing the received data to be written only to physical memory addresses in the allocated first portion of the array;

a fourth code segment for execution by the RAID controller, the fourth code segment determining whether the allocated first portion of the array is close to being filled with data; and a fifth code segment for execution by the RAID controller, wherein if it is determined that the allocated first portion of the array is close to being filled with data, the fifth code segment allocates an additional portion of the array for use by the OS and causes the received data to be written only to physical memory addresses in the additionally allocated portion of the array.

10. The non-transitory CRM of claim 9, further comprising:

a sixth code segment for execution by the RAID controller, wherein in an event that a rebuild process is to be performed for one of the PDs, the sixth code segment causes identifiers of one or more virtual memory disks of the virtual memory that correspond to the physical memory addresses of the PD for which the rebuild process is to be performed to be output from the RAID controller;

a seventh code segment for execution by the computer, the seventh code segment being a filter driver code segment, the filter driver code segment receiving the identifiers output from the RAID controller and scanning a virtual memory table of the OS to identify used virtual memory addresses associated with the identifiers, wherein used virtual memory addresses are virtual memory addresses that have been written by a file system (FS) of the OS and that have not been freed by the FS subsequent to being written by the FS, the filter driver code segment causing the used virtual memory addresses to be output from the computer to the RAID controller;

an eighth code segment for execution by the RAID controller, the eighth code segment translating the used virtual memory addresses into used physical memory addresses of the PD for which the rebuild process is being performed, and a ninth code segment for execution by the RAID controller, the ninth code segment rebuilding data and parity for the used physical addresses of the PD for which the rebuild process is being performed.

* * * * *